United States Patent
Soleyman et al.

(10) Patent No.: US 12,061,673 B1
(45) Date of Patent: Aug. 13, 2024

(54) MULTI-AGENT PLANNING AND AUTONOMY

(71) Applicant: HRL Laboratories, LLC, Malibu, CA (US)

(72) Inventors: Sean Soleyman, Calabasas, CA (US); Deepak Khosla, Camarillo, CA (US)

(73) Assignee: HRL LABORATORIES, LLC, Malibu, CA (US)

(*) Notice: Subject to any disclaimer, the term of this patent is extended or adjusted under 35 U.S.C. 154(b) by 1000 days.

(21) Appl. No.: 17/167,001

(22) Filed: Feb. 3, 2021

Related U.S. Application Data

(63) Continuation-in-part of application No. 17/064,566, filed on Oct. 6, 2020, which is a continuation-in-part of application No. 16/792,869, filed on Feb. 17, 2020.

(60) Provisional application No. 63/027,829, filed on May 20, 2020, provisional application No. 62/953,008, filed on Dec. 23, 2019, provisional application No. 62/814,133, filed on Mar. 5, 2019.

(51) Int. Cl.
G06F 18/21 (2023.01)
G06N 3/086 (2023.01)

(52) U.S. Cl.
CPC ......... *G06F 18/2185* (2023.01); *G06N 3/086* (2013.01)

(58) Field of Classification Search
CPC .............................. G06F 18/2185; G06N 3/086
USPC ....................................................... 706/25
See application file for complete search history.

(56) References Cited

U.S. PATENT DOCUMENTS

| | | | |
|---|---|---|---|
| 6,473,851 B1 | 10/2002 | Plutowski | |
| 7,849,033 B2 | 12/2010 | Sabe et al. | |
| 8,392,346 B2 | 3/2013 | Ueda et al. | |
| 9,530,412 B2 | 12/2016 | Selfridge | |
| 9,679,258 B2 | 6/2017 | Mnih et al. | |
| 10,732,639 B2 | 8/2020 | Palanisamy | |
| 10,977,551 B2 | 4/2021 | Van Seijen | |
| 11,210,585 B1 | 12/2021 | Heess | |
| 2018/0165603 A1 | 6/2018 | Van Seijen | |
| 2018/0357552 A1 | 12/2018 | Campos et al. | |
| 2019/0130067 A1* | 5/2019 | Passerini | G16H 30/40 |

(Continued)

OTHER PUBLICATIONS

Torreno et al., "Cooperative multi-agent planning: a survey", ACM Computing Surveys, vol. 50, No. 6, Article 84, Nov. 2017 (Year: 2017).*

(Continued)

*Primary Examiner* — Tsu-Chang Lee
(74) *Attorney, Agent, or Firm* — TOPE-MCKAY & ASSOCIATES

(57) ABSTRACT

Described is a system for controlling multiple autonomous platforms. A training process is performed to produce a trained learning agent in a simulation environment. In each episode, each controlled platform is assigned to one target platform that produces an observation. A learning agent processes the observation using a deep learning network and produces an action corresponding to each controlled platform until an action has been produced for each controlled platform. A reward value is obtained corresponding to the episode. The trained learning agent is executed to control each autonomous platform, where the trained agent receives one or more observations from one or more platform sensors and produces an action based on the one or more observations. The action is then used to control one or more platform actuators.

18 Claims, 10 Drawing Sheets

(56) References Cited

U.S. PATENT DOCUMENTS

| | | |
|---|---|---|
| 2019/0139967 A1 | 5/2019 | Passerini |
| 2019/0197244 A1 | 6/2019 | Fong |
| 2020/0017124 A1 | 1/2020 | Camhi |
| 2020/0104645 A1 | 4/2020 | Heess |
| 2020/0134461 A1 | 4/2020 | Chai |
| 2021/0319262 A1* | 10/2021 | Li .................. G06V 10/774 |
| 2021/0319362 A1 | 10/2021 | Mguni |

OTHER PUBLICATIONS

Notification of Transmittal, the International Search Report, and the Written Opinion of the International Searching Authority for PCT/US2020/018532; date of mailing Jun. 16, 2020.

Jederberg et al., "Human-level performance in first-person multiplayer games with population-based deep reinforcement learning." Arxiv, 2018, pp. 1-42.

K. Frans et al., "Meta Learning Shared Hierarchies." Arxiv, 2017, pp. 1-11.

Notification of the International Preliminary Report on Patentability Chapter II for PCT/US2020/018532; date of mailing Apr. 1, 2021.

The International Preliminary Report on Patentability Chapter II for PCT/US2020/018532; date of mailing Apr. 1, 2021.

D'Souza, M., et al., "Avionics self-adaptive software: towards formal verification and validation," International Conference on Distributed Computing and Internet Technology, LNCS, vol. 11319, Springer, First Online: Dec. 11, 2018, pp. 3-23.

Latek, M., et al., "Strategic Interactions in irregular warfare an agent-based model," 2009, 12 pages.

Vidal, R., et al., "Pursuit-evasion games with unmanned ground and aerial vehicles," Proceedings 2001 ICRA, IEEE International Conference on Robotics and Automation (Cat. No. 01CH37164), vol. 3, pp. 2948-2955.

Filippi, S., et al., "Oprimism in reinforcement learning and Kullback-Leibler divergence," 2010, 48th Annual Allerton Conference on Communication, Control, and Computing (Allerton), IEEE, 2010, pp. 115-122.

Office Action 1 for U.S. Appl. No. 16/792,869, Date mailed: Sep. 29, 2022.

Pieter Spronck, Marc Ponsen, Ida Sprinkhuizen-Kuyper, and Eric Postma (2006), in Adaptive Game AI with Dynamic Scripting. Machine Learning, vol. 63, No. 3, pp. 217-248, (Springer DOI: 10.1007/s10994-006-6205-6), http://www.spronck.net/publications.html.

Armon Toubman, Jan-Joris Roessingh, Pieter Spronck, Aske Plaat, and Jaap van den Herik (2014), in Dynamic Scripting with Team Coordination in Air Combat Simulation, Proceedings of the 27th International Conference on Industrial, Engineering & Other Applications of Applied Intelligent Systems, Springer-Verlag, (Presented at the IEAAIE 2014 conference), pp. 1-10.

Mnih et. al, "Asynchronous Methods for Deep Reinforcement Learning," Proceedings of The 33rd International Conference on Machine Learning, PMLR 48:1928-1937, 2016. Link: http://proceedings.mlr.press/v48/mniha16.html, pp. 1-10 and supplement pp. 1-10.

Proportional Navigation, found at https://en.wikipedia.org/wiki/Proportional_navigation, downloaded on Nov. 23, 2020.

The International Search Report of the International Searching Authority for PCT/US2020/054455; date of mailing Jul. 11, 2021.

The Written Opinion of the International Searching Authority for PCT/US2020/054455; date of mailing Jul. 11, 2021.

Pierre-Luc Bacon et al: "The Option-Critic Architecture," 2016, Proceedings of the Thirty-First AAAI Conference on Artificial Intelligence (AAAI-17), pp. 1726-1734.

Jean Harb et al: "When Waiting is not an Option : Learning Options with a Deliberation Cost," arxiv.org. Cornell University Library. 201 Olin Library Cornell University Ithaca. NY 14853, Sep. 14, 2017, pp. 1-9.

Guillaume Lample et al: "Playing FPS Games with Deep Reinforcement Learning," arxiv.org. Cornell University Library. 201 Olin Library Cornell University Ithaca. NY 14853. Sep. 18, 2016, pp. 2140-2146.

Sutton Richard S et al: "Between MOPs and semi-MOPs: A framework for temporal abstraction in reinforcement learning," Artificial Intelligence, vo 1 • 112. No. 1, Aug. 1, 1999 (Aug. 1, 1999), pp. 181-211.

Jain Deepali et al: "Hierarchical Reinforcement Learning for Quadruped Locomotion," 2019 IEEE/RSJ International Conference on Intelligent Robots and Systems (IROS), IEEE. Nov. 3, 2019 (Nov. 3, 2019). pp. 7551-7557.

Ofir Nachum et al: "Data-Efficient Hierarchical Reinforcement Learning," 32nd Conference on Neural Information Processing Systems (NeurIPS 2018), Montréal, Canada, pp. 1-11.

OpenAI Five. openai.com/blog/openai-five/, Jun. 2018, downloaded Mar. 4, 2021, pp. 1-24.

AlphaStar: Mastering the Real-Time Strategy Game StarCraft II. deepmind.com/blog/article/alphastar-mastering-real-time-strategy-game-starcraft-ii, Jan. 2019, downloaded Mar. 4, 2021, pp. 1-28.

Emergent Tool Use from Multi-Agent Interaction. openai.com/blog/emergent-tool-use/, Sep. 2019, downloaded Mar. 4, 2021, pp. 1-8.

M. Jaderberg, et al. Human-Level Performance in 3D Multiplayer Games with Population-Based Reinforcement Leaning. Science, 364(6443): pp. 859-865, 2015.

R. Lowe, et al. Multi-Agent Actor-Critic for Mixed Cooperative-Competitive Environment. arXiv:1706.02275v4, Mar. 2020, pp. 1-16.

J. N. Foerster, et al. Counterfactual Multi-Agent Policy Gradients. arXiv:1705.08926v2, Dec. 2017, pp. 1-10.

F. P. Such, et al. Deep Neuroevolution: Genetic Algorithms are a Competitive Alternative for Training Deep Neural Networks for Reinforcement Learning. arXiv:1712.06567v3, Aug. 2018, pp. 1-16.

P. D. Clive, et al. Advanced Framework for Simulation, Integration and Modeling (AFSIM). Int'l Scientific Computing, pp. 73-77, 2015.

Notification of and the International Preliminary Report on Patentability Chapter II for PCT/US2020/054455; date of mailing Feb. 28, 2022.

Pinto et al., Hierarchical Reinforcement Leaming with Monte Carlo Tree Search in Computer Fighting Game, in 11 (3 ) IEEE Transactions on Games , pp. 290-295 (2019).

Julian et al., Distributed Wildfire Surveillance with Autonomous Aircrali Using Deep Reinforcement Learning, in 42.8 J. Guidance, Control, and Dynamics, pp. 1768-1778 (2019).

Ramsredt et al., Real-Time Reinforcement Learning, in arXiv preprint arXiv: 1911.04448, pp. 1-16 (2019).

Office Action 1 for U.S. Appl. No. 17/064,566, Date mailed: Dec. 5, 2023.

Falcone et al, 2008, "A Hierarchical Model Predictive Control Framework for Autonomous Ground Vehicles" (Year: 2008).

Response to Office Action 1 for U.S. Appl. No. 17/064,566, Date mailed: Mar. 5, 2024.

Response to Office Action 1 for U.S. Appl. No. 16/792,869, Date mailed: Jan. 30, 2023.

Office Action 2 for U.S. Appl. No. 16/792,869, Date mailed: Jun. 14, 2023.

Response to Office Action 2 for U.S. Appl. No. 16/792,869, Date mailed: Sep. 13, 2023.

Office Action 3 for U.S. Appl. No. 16/792,869, Date mailed: Oct. 27, 2023.

Response to Office Action 3 for U.S. Appl. No. 16/792,869, Date mailed: Feb. 15, 2024.

Office Action 1 for Chinese Patent Application No. 202080012630.4, dated Dec. 6, 2023.

English translation of Office Action 1 for Chinese Patent Application No. 202080012630.4, dated Dec. 6, 2023.

Response to Office Action 1 for Chinese Patent Application No. 202080012630.4, dated Feb. 1, 2024.

English translation of the Proposed Claims in the Response to Office Action 1 for Chinese Patent Application No. 202080012630.4, dated Feb. 1, 2024.

(56) References Cited

OTHER PUBLICATIONS

Response to communication pursuant to Rules 161(1) and 162 EPC for the European Regional Phase Patent Application No. EP20712737.4, dated Apr. 22, 2022.

* cited by examiner

|  | Blue Win | Red Win | Draw |
|---|---|---|---|
| 1v1 | 90% | 7% | 3% |
| 2v2 | 65% | 6% | 29% |
| 3v3 | 27% | 5% | 68% |

FIG. 10

MULTI-AGENT PLANNING AND AUTONOMY

CROSS-REFERENCE TO RELATED APPLICATIONS

The present application is a Continuation-in-Part application of U.S. Ser. No. 17/064,566, filed in the United States on Oct. 6, 2020, entitled, "Autonomous Behavior Generation with Hierarchical Reinforcement Learning", which is a Continuation-in-Part application of U.S. application Ser. No. 16/792,869, filed in the United States on Feb. 17, 2020, which is a Non-Provisional application of U.S. Provisional Application No. 62/814,133, filed in the United States on Mar. 5, 2019, the entirety of which are incorporated herein by references. U.S. Ser. No. 17/064,566 is also a Non-Provisional application of U.S. Provisional Application No. 62/953,008, filed in the United States on Dec. 23, 2019, the entirety of which is incorporated by reference.

This is also a Non-Provisional Application of U.S. Provisional Application No. 63/027,829, filed in the United States on May 20, 2020, entitled, "Multi-Agent Planning and Autonomy," the entirety of which is incorporated herein by reference.

GOVERNMENT LICENSE RIGHTS

This invention was made with government support under U.S. Government Contract Number HR0011-19-90018. The government may have certain rights in the invention.

BACKGROUND OF INVENTION

(1) Field of Invention

The present invention relates to a system for multi-agent planning and autonomy and, more particularly, to a system for multi-agent planning and autonomy using a neuroevolution-based process.

(2) Description of Related Art

Multi-agent systems can be utilized in a variety of domains, including robotics telecommunications, and economics. Each agent must discover a solution in these domains on its own, using learning. Multi-agent reinforcement learning (RL) allows for cooperative and competitive tasks. Currently, control of real-world autonomous systems, such as military and civilian unmanned platforms, especially unmanned aerial vehicles (UAVs) for surveillance and targeted strikes on ground targets, is typically performed remotely by a human user. Control of autonomous platforms is too complex for solutions with traditional non-learning methods involving decision tree analysis or game tree search.

Most of the recent prior art in similarly complex, but less realistic, video game domains, is based on actor-critic RL methods (see Literature Reference Nos. 1-6 of the List of Incorporated Literature References). The key deficiency of actor-critic RL methods is the failure to adequately address the temporal exploration problem. Any autonomous machine-learning platform must perform some form of exploration (i.e., trying out different things) in order to learn what works best. Actor-critic RL algorithms usually do this by randomizing the action at each step, but this is potentially problematic in some application domains because some missions can last for hours, and the passage of time must, therefore, be approximated using hundreds or thousands of steps.

A neuroevolution-based process can address the temporal exploration problem more effectively. Literature Reference No. 7 describes using neuroevolution to play simple Atari games and to control a single robot in a simulated environment. However, the work did not provide a method for extending to multi-agent application domains.

Thus, a continuing need exists for a task-allocation mechanism for controlling multi-agent teams of platforms while addressing the temporal exploration problem of prior methods.

SUMMARY OF INVENTION

The present invention relates to a system for multi-agent planning and autonomy, and more particularly, to a system for multi-agent planning and autonomy using a neuroevolution-based process. The system comprises one or more processors and a non-transitory computer-readable medium having executable instructions encoded thereon such that when executed, the one or more processors perform multiple operations. The system performs a training process to produce a trained learning agent in a simulation environment comprising a plurality of controlled platforms and a plurality of target platforms. For each simulation time-step until an episode ends, each controlled platform is assigned to one target platform, wherein each target platform produces an observation. Each observation is processed with a learning agent using a deep learning network. For each observation, the learning agent produces an action corresponding to each controlled platform until an action has been produced for each controlled platform in the simulation environment. A reward value corresponding to the episode is obtained. The trained learning agent is executed to control each autonomous platform comprising a plurality of platform sensors and platform actuators. Executing the trained agent comprises receiving, by the trained agent, one or more observations from at least one platform sensor; producing an action based on the one or more observations; and using the produced action, controlling one or more platform actuators.

In another aspect, during the training process, a set of parameter vectors having a plurality of parameters is randomly initialized, each parameter vector defining a set of network weights for the deep learning neural network. A plurality of iteration of an evaluation process, a selection process, a replication process, and a mutation process are performed on the set of parameter vectors. The evaluation process comprises using the simulated environment to produce a fitness score based on the reward value, wherein the selection and replication processes comprise selection and replication of certain parameter vectors based on fitness scores; and wherein the mutation process comprises adding random numbers to some or all parameters in each parameter vector.

In another aspect, the selection process is performed by deleting all parameter vectors that receive a fitness score below a predetermined threshold, and wherein the replication process is performed by sampling from remaining parameter vectors of the selection process uniformly with replacement.

In another aspect, in the mutation process, a randomly selected fraction of the replication vectors are not mutated.

In another aspect, the Kuhn-Munkres algorithm is used to assign each controlled platform to one target platform.

In another aspect, each autonomous platform is an autonomous vehicle.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where:

FIG. 10 is a table illustrating win, loss, and draw statistics during execution.

DETAILED DESCRIPTION

Figure 1:
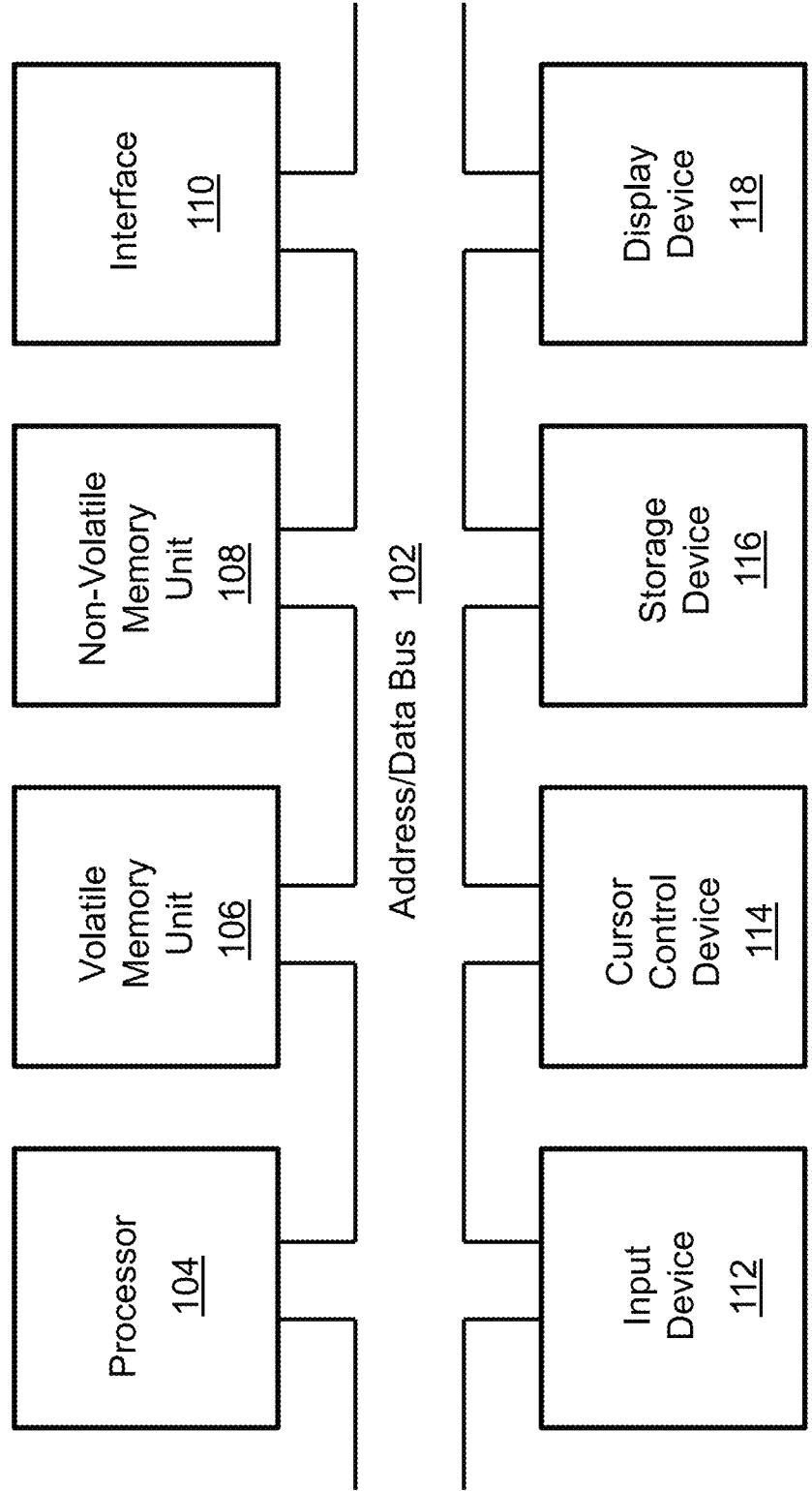
FIG. 1 is a block diagram depicting the components of a system for multi-agent planning and autonomy according to some embodiments of the present disclosure.

The present invention relates to a system for multi-agent planning and autonomy, and more particularly, to a system for multi-agent planning and autonomy using a neuroevolution-based process. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) List of Incorporated Literature References

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number, as follows:

1. OpenAI Five. openai.com/blog/openai-five/, June 2018.
2. AlphaStar: Mastering the Real-Time Strategy Game StarCraft II. deepmind.com/blog/article/alphastar-mastering-real-time-strategy-game-starcraft-ii, January 2019.
3. Emergent Tool Use from Multi-Agent Interaction. openai.com/blog/emergent-tool-use/, September 2019.
4. M. Jaderberg, et al. Human-Level Performance in 3D Multiplayer Games with Population-Based Reinforcement Leaning. Science, 364(6443): 859-865, 2015.
5. R. Lowe, et al. Multi-Agent Actor-Critic for Mixed Cooperative-Competitive Environment. arXiv: 1706.02275v4, March 2020.
6. J. N. Foerster, et al. Counterfactual Multi-Agent Policy Gradients. arXiv:1705.08926v2, December 2017.
7. F. P. Such, et al. Deep Neuroevolution: Genetic Algorithms are a Competitive Alternative for Training Deep Neural Networks for Reinforcement Learning. arXiv: 1712.06567v3, August 2018.
8. P. D. Clive, et al. Advanced Framework for Simulation, Integration and Modeling (AFSIM). Int'l Scientific Computing, 73-77, 2015.

(2) Principal Aspects

Various embodiments of the invention include three "principal" aspects. The first is a system for multi-agent planning and autonomy. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein. In various aspects, the computer system 100 can be embodied in any device(s) that operates to perform the functions as described herein as applicable to the particular application, such as a desktop computer, a mobile or smart phone, a tablet computer, a computer embodied in a mobile platform (e.g., one or more autonomous vehicles), or any other device or devices that can individually and/or collectively execute the instructions to perform the related operations/processes.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM ("EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 104. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
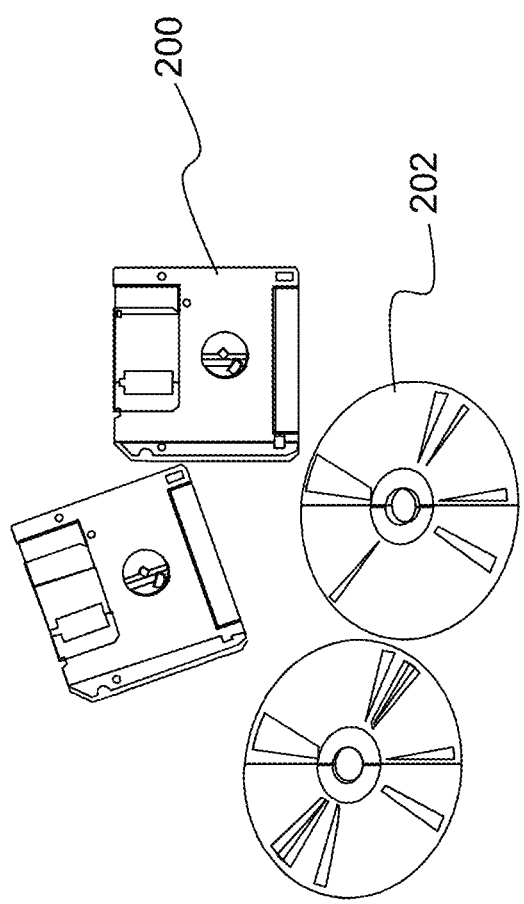
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Specific Details of Various Embodiments

Described herein is a control system for a team of multiple mobile units, also referred to as multi-agent teams of platforms (e.g., aircraft, watercraft, ground units, satellites, space exploration vehicles, and/or robots). Task allocation algorithms, such as the Kuhn-Munkres (Hungarian) algorithm, are used for target assignment in state-of-the-art simulators, such as Advanced Framework for Simulation and Modeling (AFSIM) (described in Literature Reference No. 8). The control system operates by using a unique combination of deep neuroevolution with an allocation-based task assignment approach. Neuroevolution is a form of artificial intelligence (AI) that uses evolutionary algorithms to generate artificial neural networks (ANN), parameters, topology, and rules. In the present invention, neuroevolution is used to control the actions of individual platforms, and also (in an alternative embodiment), to implement a learnable cost/utility function to replace the distance-based heuristic cost/utility provided as input to prior art allocation algorithms incorporated in AFSIM, such as described in Literature Reference No. 8. Experimental results, described in detail below, show that the method described herein exceeds performance of AFSEVI's current scripted artificial intelligence (AI).

The present invention includes a series of incremental innovations upon existing neuroevolution methods that improve their effectiveness in this application domain. These innovations include a unique mutation operator and a partially asynchronous method for parallel execution of trials for fitness determination. Each of these aspects will be described in further detail below.

The invention described herein was developed and tested using a simulated multi-agent air engagement scenario. The scenario was built using the AFSIM. The simulated environment contains up to six platforms under control of the agent (i.e., control platforms), and six adversary platforms controlled by a scripted AI (i.e., target platforms). At the beginning of each episode, all of these platforms are placed at random locations within a certain region of the map. The action space for each controlled unit consists of selecting any target on the opposing team, pursuing the selected target, firing missiles at the selected target, supporting a weapon that has been fired, evading an incoming weapon, or maintaining a steady course. The observation consists of positions and velocities of all units. At the end of each episode, the environment returns a reward (or fitness score) of +3000 if the controlled platforms have defeated all of the target platforms, −3000 if the situation is reversed, and 0 if neither side is able to destroy all adversary targets within a pre-set time limit. If one side runs out of missiles, the simulation is terminated early and a reward of 0 is also assigned in this case.

Figure 3:
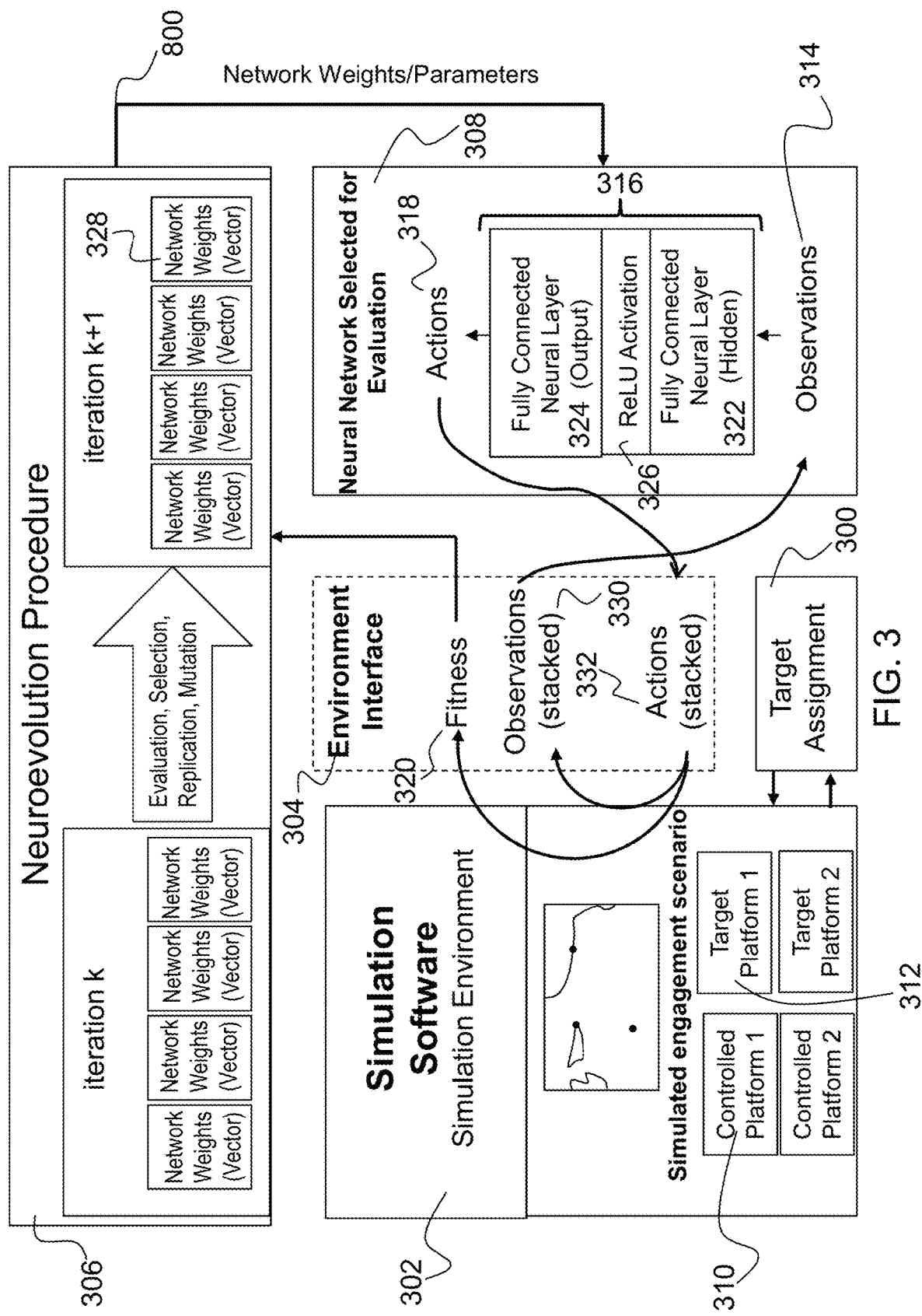
FIG. 3 is an illustration of an overview of the system for multi-agent planning and autonomy, including elements needed for training with neuroevolution, according to some embodiments of the present disclosure.

An overview of the present invention is illustrated in FIG. 3 and described in the form of pseudocode described below. The key components of the method include a target assignment 300 component, simulation software 302 component, an environment interface 304 component, a neuroevolution procedure 306 component, and a neural network 308 selected for evaluation. Target assignment 300 is the component that enables extension of a single neuroevolution agent to control multiple platforms, such as aircraft or autonomous vehicles. The environment interface 304 is a component of the software architecture. In the object-oriented software implementation of the environment interface 304 and the simulation software 302, there are two method steps. The first "reset" step initializes the positions of the platforms (e.g., aircraft) in the simulation software 302 and provides an initial observation to a controller in the environment interface 304. The second step takes an action from the controller in the environment interface 304, runs the simulation for one time-step in the simulation software 302, and outputs a new observation to the environment interface 304. At the end of each simulation episode (e.g., when one team has destroyed all of the opponent's aircraft), the method also provides a Boolean indicator that the episode is done, and provides a fitness score that is used for improving the neuroevolution procedure 306 and controller.

A task allocation algorithm (based on the Kuhn-Munkres "Hungarian" algorithm in one embodiment) assigns each controlled platform 310 in the simulation (simulation software 302) to one particular target platform 312. This greatly simplifies the task of the neural network 308 (also referred to as a learning agent) selected for evaluation by providing it with a single observation 314 for each controlled platform 310. The neural network 308 is capable of learning from its experiences. It starts with some basic knowledge and is then able to act and adapt autonomously, through learning, to improve its own performance. The neural network 308 uses a deep neural network 316 to process these observations 314 individually, either one-by-one or in parallel. For each observation 314, the selected neural network 308 outputs an action 318 corresponding to a single controlled platform 310. Once the neural network 308 has produced an action 318 for each controlled platform in the environment, a simulated time-step is performed. The process repeats until the episode ends in a win, loss, or draw. At this point, the simulation environment returns a numerical reward corresponding to win, loss, or draw. During training, a genetic algorithm uses this reward as a fitness score 320 so that it can perform the neuroevolution procedure 306 on a population.

In an episodic framework, there is a loop that periodically resets the simulator (i.e., simulation software 302) to a starting condition (e.g., a situation where each team has three aircraft placed in random locations on the map), then the simulation is allowed to run for a number of time-steps (e.g., 1000 time-steps maximum, or until there is a winner, whichever comes first), and then the process repeats with a new reset. Steps within a single episode are connected (i.e., aircraft do not move erratically within a single simulation), but different episodes are completely independent (i.e., actions taken within one episode have no effect on the outcomes of other episodes).

The simulation software 302, the environment interface 304, and the neural network 308 selected for evaluation components of FIG. 3 run in a loop for one episode. Then, at the end of the episode, the fitness score 320 is sent to the neuroevolution procedure 306. The neuroevolution procedure 306 runs one or more full episode(s) with each set of network weights (e.g., 328) in the population so that it can assign a fitness score 320 to each set of network weights. The fitness score 320 is a numerical value that represents whether a particular set of network weights 328 results in good performance (win) or poor performance (loss). The neuroevolution procedure 306 uses the fitness scores 320 to determine which neural networks are selected for the next generation. Once a neural network has been trained, the reward fitness score 320 (also referred to as a reward value) is no longer needed. It is only used during training for an evaluation step of the neuroevolution procedure 306, where it is determined which networks to keep for the next generation and which ones to eliminate.

The deep neural network 316 that was used in one embodiment of the invention uses a fixed, fully-connected topology, where only the weights evolve during training. It has one hidden layer 322 with eighty neurons and one output layer 324 with five neurons (one neuron corresponding to each available action). A rectified linear unit (ReLU) activation layer 326 is placed between the hidden layer 322 and the output layer 324. The action 318 is selected deterministically using the argmax of all output neuron values. As known to those skilled in the art, argmax is an operation that finds the argument that give the maximum value from a target function. Stochastic action selection, where the action 318 is sampled from a discrete distribution with each action's probability determined based on the softmax of its corresponding logit, was also used in experiments. As known to those skilled in the art, softmax is an operation that turns arbitrary real values into probabilities. The results were acceptable, but not as good as with the deterministic approach.

Since each neural network is implemented using matrix operations, the neural network is able to take in a matrix of multiple observations and process them to produce multiple actions. In this way, a single neural network produces one action (behavior) for each of the controlled platforms. For example, if there are two platforms, each assigned on one target, an observation matrix (e.g., 704 in FIG. 7) will have two rows. The first row contains the observations (e.g., position, velocity) of the first platform and its target (or the relative position and velocity of the target with respect to the platform). The second row contains the observations (e.g., position, velocity) of the second platform and its target (or the relative position and velocity of the target with respect to the platform). The neural network processes all of the "stacked" rows (i.e., observations (stacked) 330) in one shot, producing one action for each controlled platform (i.e., actions (stacked) 332).

Figure 4:
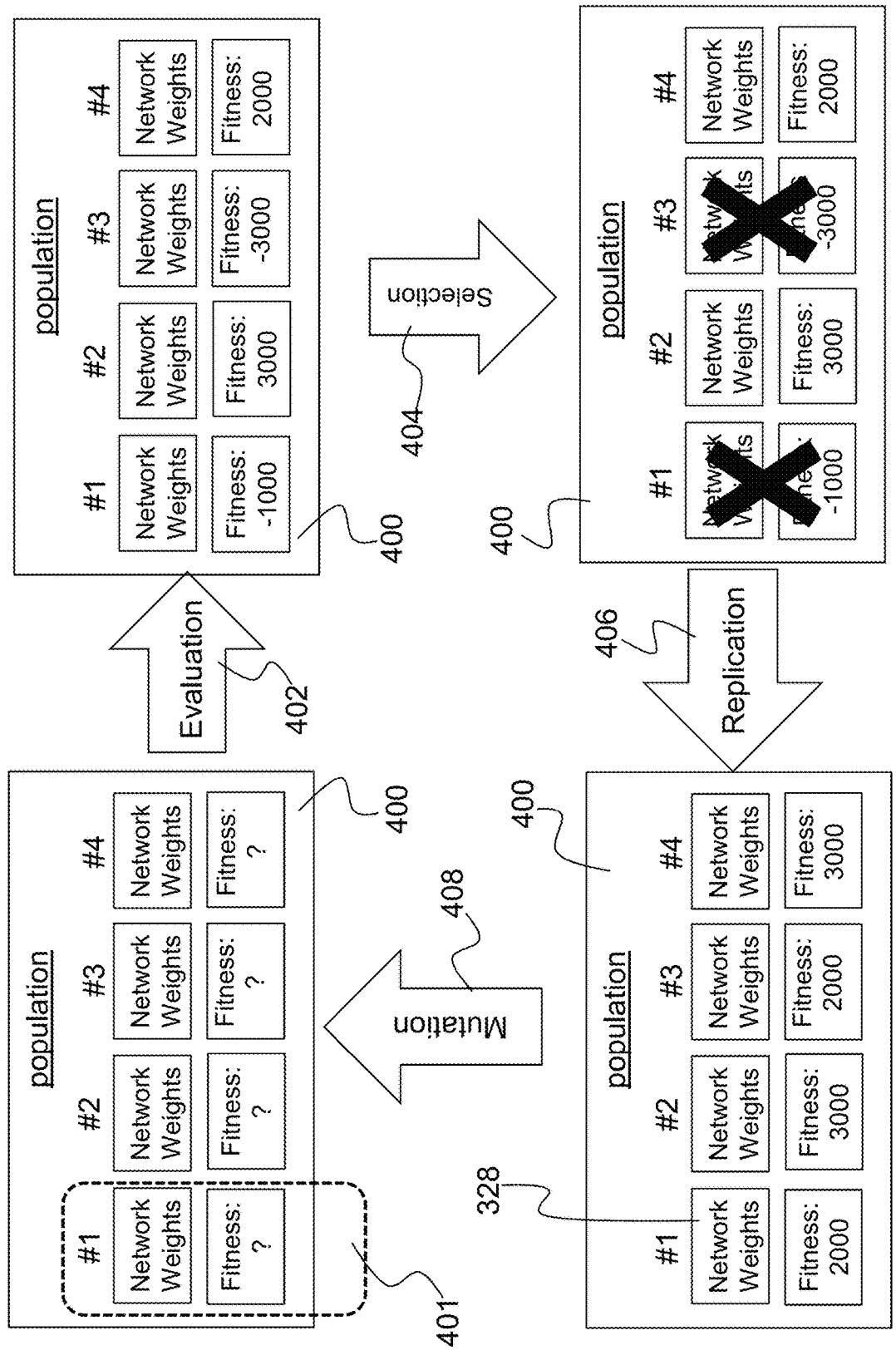
FIG. 4 is an illustration of a procedure for performing neuroevolution according to some embodiments of the present disclosure.

The following is a description of the neuroevolution procedure 306 used to produce neural network weights 328 that yield effective autonomous behaviors. The method is illustrated in FIG. 4 and also described in the pseudocode below. It is best to view the training procedure as being performed on a population, not on an individual; this is a key difference between neuroevolution and traditional reinforcement learning algorithms. FIG. 4 illustrates a population 400 of multiple neural networks 401 and neural network weights 328. However, a single one of these neural networks 401 is able to control the low-level behavior of all of the multiple physical platforms (e.g., aircraft). The reason for having a population of multiple neural networks 401 (e.g., 100 in experimental studies) is that in the selection step (analogous to Darwinian survival of the fittest), the best twenty out of the population are kept, and the lower performers are eliminated. This is how the evolutionary process improves performance as training progresses.

For the purpose of this technical description, the population is defined as a set of parameter vectors, each vector specifying the network weights 328 for a neural network 401. FIG. 4 shows a population 400 of size 4, but the actual population size used for experiments was 100. At the start of training of a population of neural networks 401, each element of each of the 100 vectors was initialized with a random number sampled uniformly from the interval $[-1.0/\sqrt{(n\_inputs)}, 1.0/\sqrt{(n\_inputs)}]$. Next, several iterations of evaluation 402, selection 404, replication 406, and mutation 408 were performed on this population. In this context, "training" of the neural networks 401 refers to the neural networks 401 being evaluated, selected, replicated, and mutated to create a new population (i.e., the next epoch or generation).

Evaluation 402 is the process of assigning a fitness score 320 to each set of network weights 328. This is done based on the result returned by the environment at the end of the episode. Although the environment is stochastic, network weights 328 representing effective policies are expected to achieve high average fitness scores 320 because they will result in a larger number of wins from the environment. After evaluation 402 is complete, a selection 404 scheme must be used to remove low-performing neural networks 401 from the population (depicted by an "X" through the individuals). One embodiment uses a threshold selection method where all neural networks 401 with a fitness score 320 below a certain percentile (e.g. 70%) are removed from the population. The population size is subsequently returned to its original value of 100 in the next step, replication 406. A new population is created by sampling uniformly with replacement from the selected neural networks 401. In the experimental studies, 100 iterations were utilized to produce the 1v1 results and 200 iterations were utilized to produce the 2v2 and 3v3 results shown in FIG. 10. Finally, mutation 408 was applied to some or all of the neural networks 401 in the population. In its traditional form, mutation 408 of a fixed-topology neural network 401 consists of adding random numbers to all of the parameters in each vector. This approach produced acceptable results, but a unique mutation operator that was found to be even more effective will be described in detail below.

Several other alternatives to the selection 404 and replication 406 process are also possible, and they are likely to be just as feasible as the threshold approach that was employed. Roulette wheel selection combines the two steps into one by sampling the new population from the old population with replacement, with the probability of selecting each neural networks 401 being equal to the neural network's 401 fitness score 320 divided by the sum of all fitness scores 320 obtained during evaluation. In order to use this approach, some type of transformation would need to be applied to the fitness scores 320 to ensure that they are all positive. This could be accomplished using methods known to one skilled in the art, such as rank scaling, sigma scaling, or Boltzmann scaling among others.

One simple technique that was included in experiments (but not considered to be essential) is elitism. At the end of each iteration, the highest-performing neural network 401 is copied over to the next generation without undergoing mutation. This helps to ensure monotonic improvement of the population, but does not guarantee it. The difficulty is that it is possible for a poor performer to achieve high results purely due to chance, and this low-performer would then take the place of the true "elite" neural network 401 that may be present in the population. To help reduce the likelihood of this occurrence, multiple trial episodes were performed on each neural network 401, and the results were averaged to obtain a more meaningful fitness score 320. Due to the high computational cost associated with this approach, it was only applied to the final iteration. By performing 30 evaluation runs on each neural network 401 in the final iteration, a high performer could be selected to represent the final result of the training algorithm. This helped to achieve consistent results, because this final representative is the actual neural network 401 that will be used to report win/loss/draw rates after training has completed. To help reduce the likelihood of non-monotonic improvement during training, a unique mutation operator, described later in this disclosure, was employed.

A critical innovation of the present invention was the incorporation of an allocation algorithm into this machine learning system to create a learning-planning hybrid. The allocation algorithm (e.g., Hungarian algorithm) executes several times during the evaluation phase of training, and the final AI (neural network ultimately selected from the population in the final epoch of the evolution) control system continues to make use of this algorithm after training is complete. The allocator assigns each controlled platform to one target platform.

This effectively reduces the learning problem from a multi-agent cooperative problem to a single-agent learning problem. A number of specific algorithms could be used to accomplish this target allocation task. The simplest would be to assign each controlled platform to the nearest available target platform. This would be potentially ineffective because multiple assets could be assigned to one task even while other tasks might be left un-allocated. Once training is complete, the "final" neural network makes use of the allocation algorithm in exactly the same way that it is used during training. First, the allocator assigns each controlled platform to one target platform. Then, the observations for each pair of controlled platform plus a targeted platform are provided to the neural network, which selects a behavior based only on these two observations (ignoring all of the other platforms that are not part of this pairing).

Figures 5A, 5B:
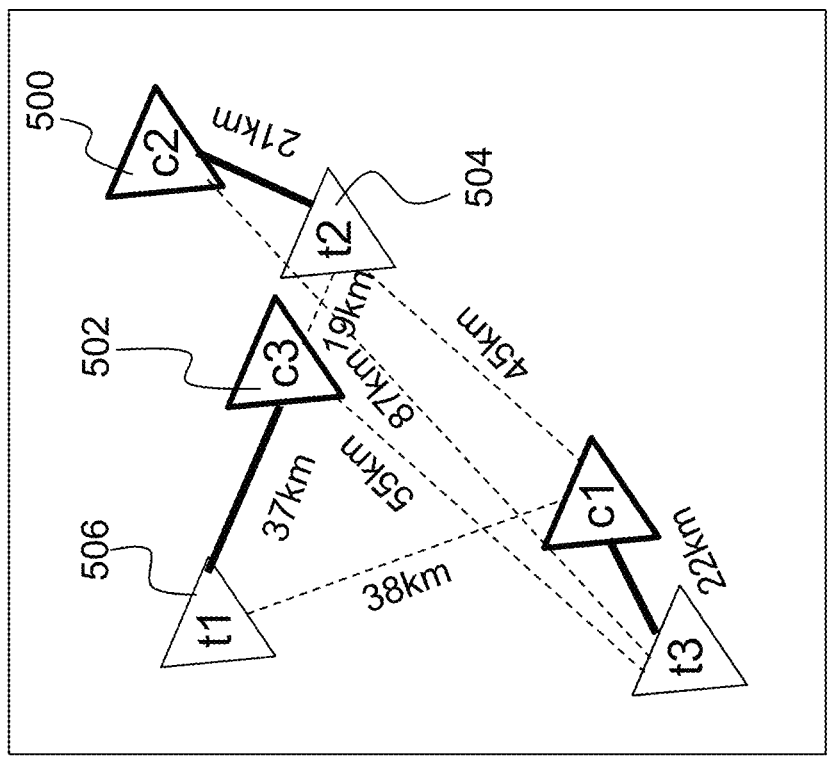
FIG. 5A is an illustration of an example target assignment according to some embodiments of the present disclosure.
FIG. 5B is an illustration of a distance matrix according to some embodiments of the present disclosure.
Figure 7:
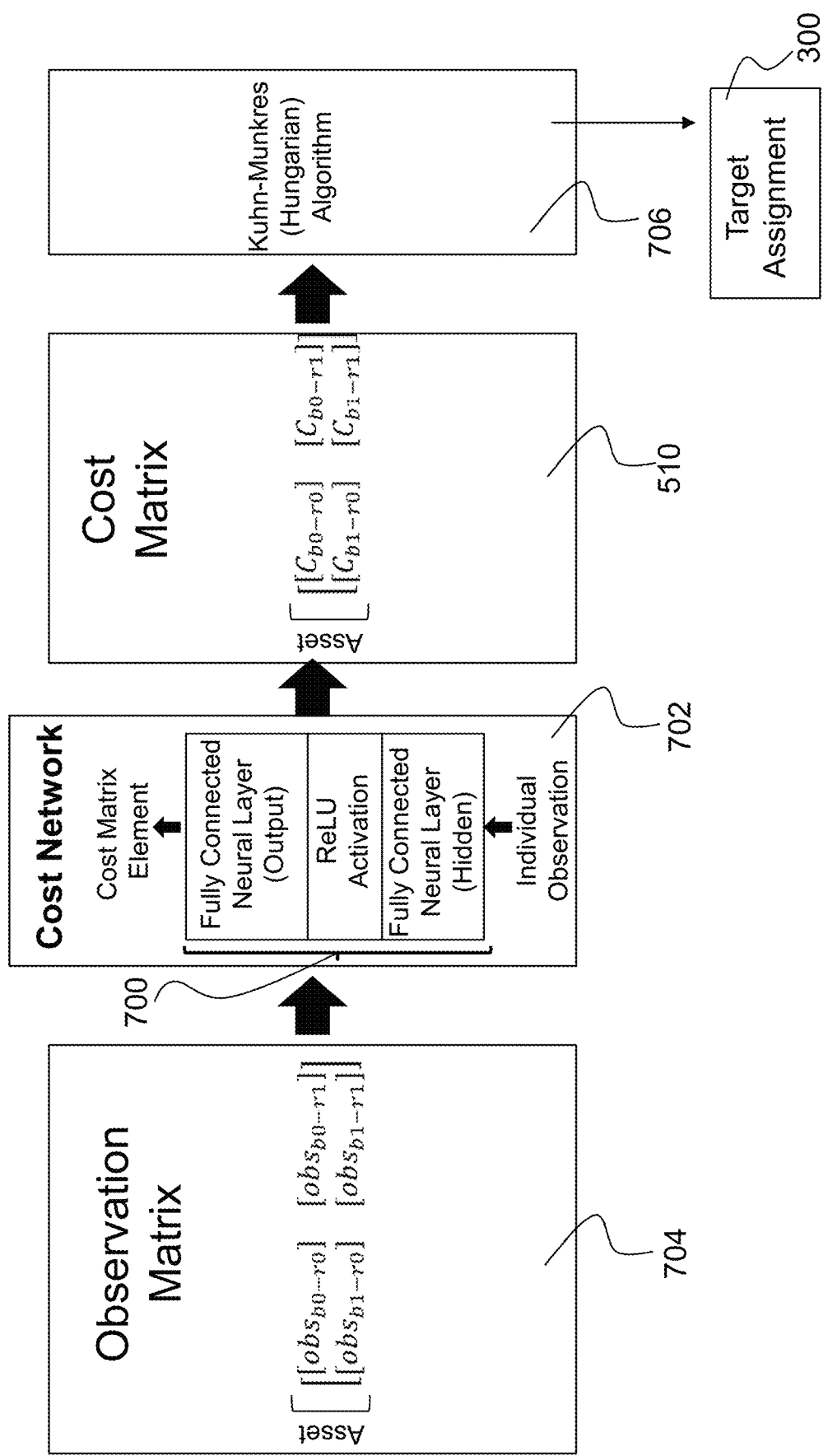
FIG. 7 is an illustration of task allocation with a learnable cost function according to some embodiments of the present disclosure.

FIG. 5A illustrates the functionality of the target assignment 300 component. In FIG. 5A, controlled platform 2 (c2) 500 and controlled platform 3 (c3) 502 would both target platform 2 (t2) 504 and no platform would be assigned to target platform 1 (t1) 506 if a simple nearest assignment were utilized. In air engagements, it is empirically more effective to leave no target un-allocated unless there are fewer assets than targets. Therefore, the Kuhn-Munkres (Hungarian) algorithm was used to solve a linear sum optimal cost problem. As shown in FIG. 5B, an observation matrix, in this case a distance matrix D 508, was created with the distances between platforms, with each row corresponding to one asset, each column corresponding to one task, and each element corresponding to the straight-line distance from the asset to the task. Then, a cost matrix C 510 was computed using the element-wise formula $C_{i,j}=-1.0/(D_{i,j}+0.001)$. This formula assigns low (more negative) costs to assignments where the asset is close to the target. The small number added to the denominator prevents the cost from becoming extremely negative when an asset gets very close to its target. If there are fewer assets than targets, some targets will not have an assigned asset. If there are more assets than targets, multiple iterations of this Kuhn-Munkres assignment algorithm are performed, where after each iteration, the targets that already have an assigned asset are removed from consideration. This makes it possible for multiple controlled platforms to team up against a single target, but only after at least one has been assigned to every target. As shown in FIG. 7, the cost matrix C 510 is the input to the Kuhn-Munkres Hungarian algorithm 706. The output of the Kuhn-Munkres Hungarian algorithm 706 is the target assignment 300. As illustrated in FIG. 5A, the target assignment 300 is a mapping from the three controlled platforms to the three selected targets: c1→t3, c2→t2, c3→t1.

FIG. 4 illustrates a population of multiple neural networks 401; however, a single one of these neural networks 401 is able to control the low-level behavior of all of the multiple platforms. The reason for having a population of multiple neural networks 401 (100 in our experiments) is that in the selection 404 step (analogous to Darwinian survival of the fittest), the best 20 out of the population are kept, and the lower performers are eliminated. This is how the evolutionary process improves performance as training progresses.

At the end of the training process, the set of neural network connection weights 328 with the highest associated fitness score 320 is selected to produce a final "trained" neural network 401 that can be used for execution. When this set of neural network connection weights 328 is combined with the neural network architecture and target assignment sub-system described above, a single neural network 401 is obtained that is capable of executing autonomous behaviors in multi-agent (e.g., multiple vehicle) scenarios. Non-limiting examples of autonomous behaviors include pure pursuit, lead pursuit, lag pursuit, weapon firing, weapon support (for certain radar-guided missiles), and evasive maneuvers. The invention described herein enables autonomy by selecting these behaviors at appropriate times, and by directing them towards appropriate targets.

In this sense, it is possible to view the invention described in this disclosure as a control system that produces autonomous behavior by taking in observations (e.g., positions and velocities of aircraft, number of remaining missiles) and outputting actions. The neural network 401 selects behavioral-level actions, such as "pursue," "evade," and "fire weapon." Together with the target assignments 300, these behavioral-level actions are translated to low-level actions, such as making the aircraft turn right or left. The pseudocode for the methods illustrated in FIG. 3 is as follows:

Training Process:
Randomly initialize a set Π of N parameter vectors, each defining weights for one neural network 316.
For each iteration k:
  #Evaluation
  For each parameter vector π in Π:
    Start a new simulation episode with randomized initial conditions
    For each simulation time-step i until the episode ends:
      Use the Kuhn-Munkres algorithm to assign each controlled platform to a nearby target (target assignment 300)
      For each controlled platform 310p:
        Obtain the observation 314 obs of the target platform to which controlled platform 310 p is assigned, with respect top
        Apply the neural network 316 specified by π to input observation 314 obs to produce an output action 318 a
        Specify to the environment that in the next step, controlled platform 310 p will take action 318 a Perform one time-step of simulated dynamics in the environment
Store the fitness value 320 returned by the environment in a data structure that associates it with π
Selection 404
Determine a threshold fitness value T to be at a certain percentile (e.g., 70%) obtained in evaluation 402
Delete from Π all parameters values associated with a fitness score lower than T
Replication 406
Create a new full set of parameter vectors Π by sampling uniformly with replacement from Π
Mutation 408
Add a number sampled from a Gaussian distribution to each element of each parameter vector.

Figure 6:
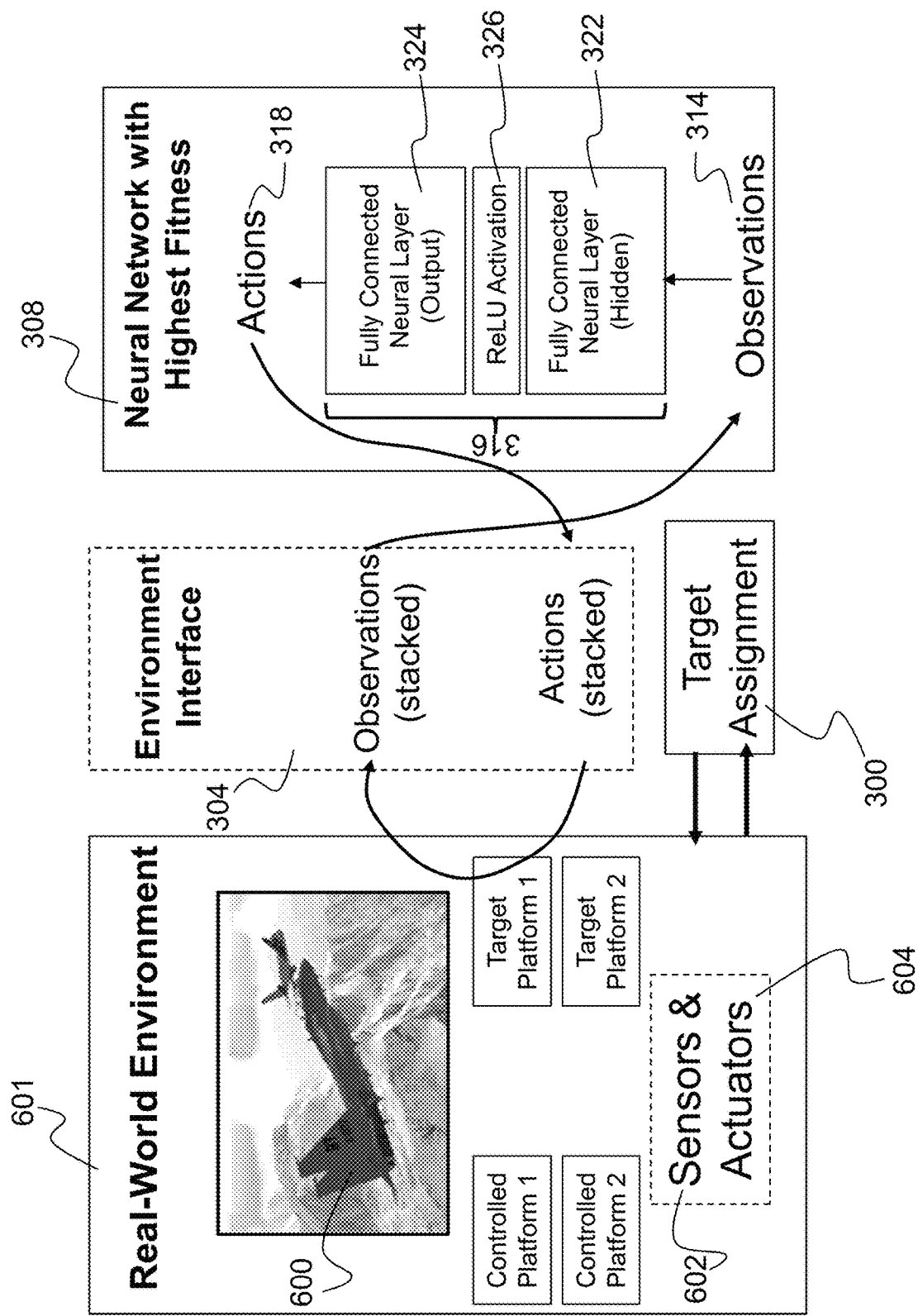
FIG. 6 is an illustration of execution on a real-world autonomous platforms according to some embodiments of the present disclosure.

Going one step further, the neural network 308 (which was trained in a simulated environment) can be used to control a real-world autonomous platform (such as an unmanned aerial vehicle (UAV)). FIG. 6 depicts execution of the invention described herein on real-world autonomous platforms 600 in a real-world environment 601. In this case, the trained neural network 308 receives observations 314 from the platform sensors 602, and the action 318 output is used to control platform actuators 604. For instance, aircraft use sensing systems, such as GPS and radar, to localize their own positions and those of enemy aircraft. Non-limiting examples of actuators include aileron actuators, elevator actuators, rudder actuators, throttle actuators, and weapon firing components and mechanisms. The signals from these sensors are typically pre-processed into positions and velocities either before they are provided to the "agent" or in an input pre-processing component of the "agent". It is likely that the hierarchical approach described in U.S. Provisional Application No. 62/953,008, which is incorporated by reference as though fully set forth herein, will be especially useful in this case. At the end of the "training process", the output is a single "trained agent" or neural network 401 that controls a team of multiple platforms (e.g., aircraft, vehicles).

At a high level, the action 318 output by the artificial deep neural network 316 can be used to select a high-level behavior, such as pursuing an opponent or firing a weapon. However, a set of low-level behavior policies must then be used to produce continuous control signals to drive the actuators 604. In one embodiment, the deep neural network 316 has one "output neuron" corresponding to each possible selection. The selection is made based on which output has the highest value. Connections between all of the neurons have varying "connection weights", which are numerical quantities specified by a "parameter vector" containing all of the weights. The purpose of the learning/evolution process is to find a set of connection weights 328 that causes an effective action to be associated with each possible observation input.

It should be emphasized that aside from controlling real-world autonomous platforms 600, the technology was also developed for a secondary use case of mission planning and analytics. Here, an end purpose of the present invention is to provide autonomous behavior for platforms in the simulated environment so that analysts can determine likely outcomes of mission scenarios. The AI neural network 308 can be used to simulate behavior of both manned and unmanned platforms 600 in simulation.

Two additional innovations are shown in the pseudocode for an enhanced mutation operator described below, which replaces the simple traditional mutation operator described above. The first change is that not all of the individuals (parameter vectors) in the population are mutated. Instead, a randomly-selected fraction of these vectors remain unchanged. In one non-limiting example, p_mutation=0.5 was used. This helps to provide more monotonic improvement during training by greatly reducing the possibility that all of the high performers are destroyed by mutations. Also, the noise standard deviation is sampled from an interval of possibilities instead of using a fixed standard deviation. This has the effect of applying various levels of mutation to different individuals. This reduces the sensitivity of the training procedure to an arbitrary fixed standard deviation parameter (e.g., std_max=0.1).

Mutation Procedure According to the Invention:
For each parameter vector π in Π:
Sample x uniformly from [0.0, 1.0]
If x>p_mutation:
Sample std uniformly from [0.0, std_max]
For i in len(π):
Sample a random number y from a normal distribution with standard deviation std $\pi_i + y \to \pi_i$ FIG. 7 shows task allocation with a learnable cost function. In this alternative embodiment, a separate deep neural network 700 is used to compute the cost function that is used for target assignment 300. The original assignment approach uses a distance-based cost function that is effective in practice, but does not take all available inputs into account. For example, if turn rate is limited, it may be advantageous for a controlled platform to target a platform in front of it instead of one that is closer by but behind. This cost network 702 is trained using the same population-based neuroevolution approach that is used for the action selection network. It can either be trained jointly (with each parameter vector specifying weights for both networks) or it can be trained separately after the action selection network has been trained. Aside from this cost network 702 being used to translate an observation matrix 704 to a cost matrix 510, the same allocation approach involving the Kuhn-Munkres algorithm 706 can be used to produce target assignment 300.

Figure 8:
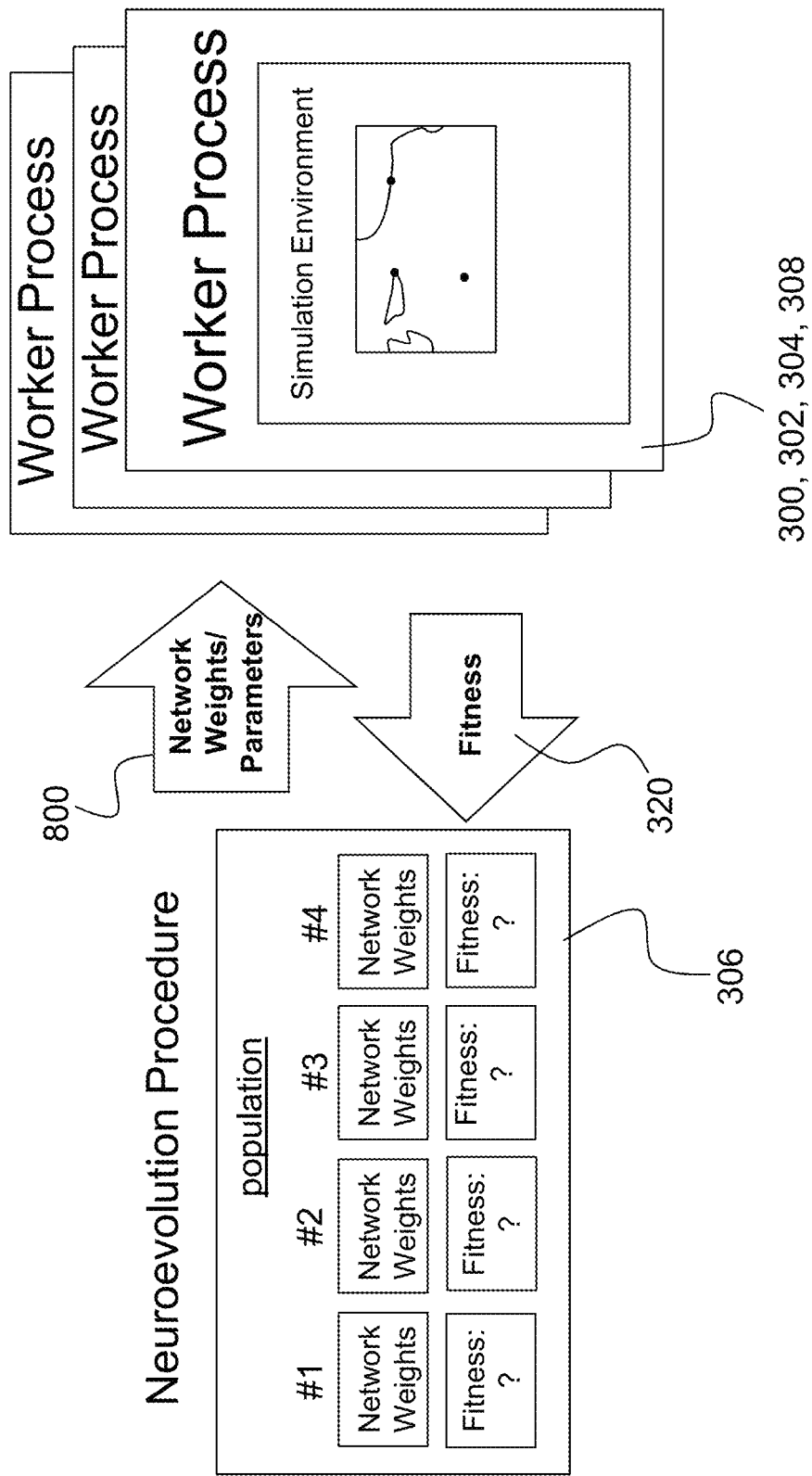
FIG. 8 is an illustration of a parallelization scheme according to some embodiments of the present disclosure.

By adopting a parallelized evaluation approach, training was sped up by more than an order of magnitude. Instead of evaluating each parameter vector π sequentially as indicated in the "Training Process" above, each evaluation was performed in a separate thread or process as shown in the parallelization scheme of FIG. 8. FIG. 8 illustrates that the software runs in multiple parallel processes, and not a single sequential thread. The "Worker Process" encompasses target assignment 300, simulation software 302, environment interface 304, and neural network selected for evaluation 308 in FIG. 3. As in FIG. 3, the neuroevolution procedure 306 sends network weights/parameters 800 to the "Worker Process" 300, 302, 304, and 308, which sends the fitness score 320 back to the neuroevolution procedure 306.

If there are more evaluations to be performed than available processors, an asynchronous solution is adopted. First, each available processor starts with one evaluation procedure in the "Worker Process" 300, 302, 304, and 308. Each evaluation procedure requires the simulation of an entire episode from start to finish (e.g., from when the platforms are placed on the map until either one team wins or the time limit has elapsed). Multiple "Worker Process" boxes are shown to represent that several simulations are run simultaneously. Typically, one hundred or more evaluations are performed in each iteration. When each process finishes, new network weights/parameters 800 are generated until all evaluations for the iteration have been completed. This asynchronous approach makes excellent use of computing resources when episodes have variable length, because it is possible for one processor to start working on a new evaluation even if some of the other processors are still busy.

Figure 9:
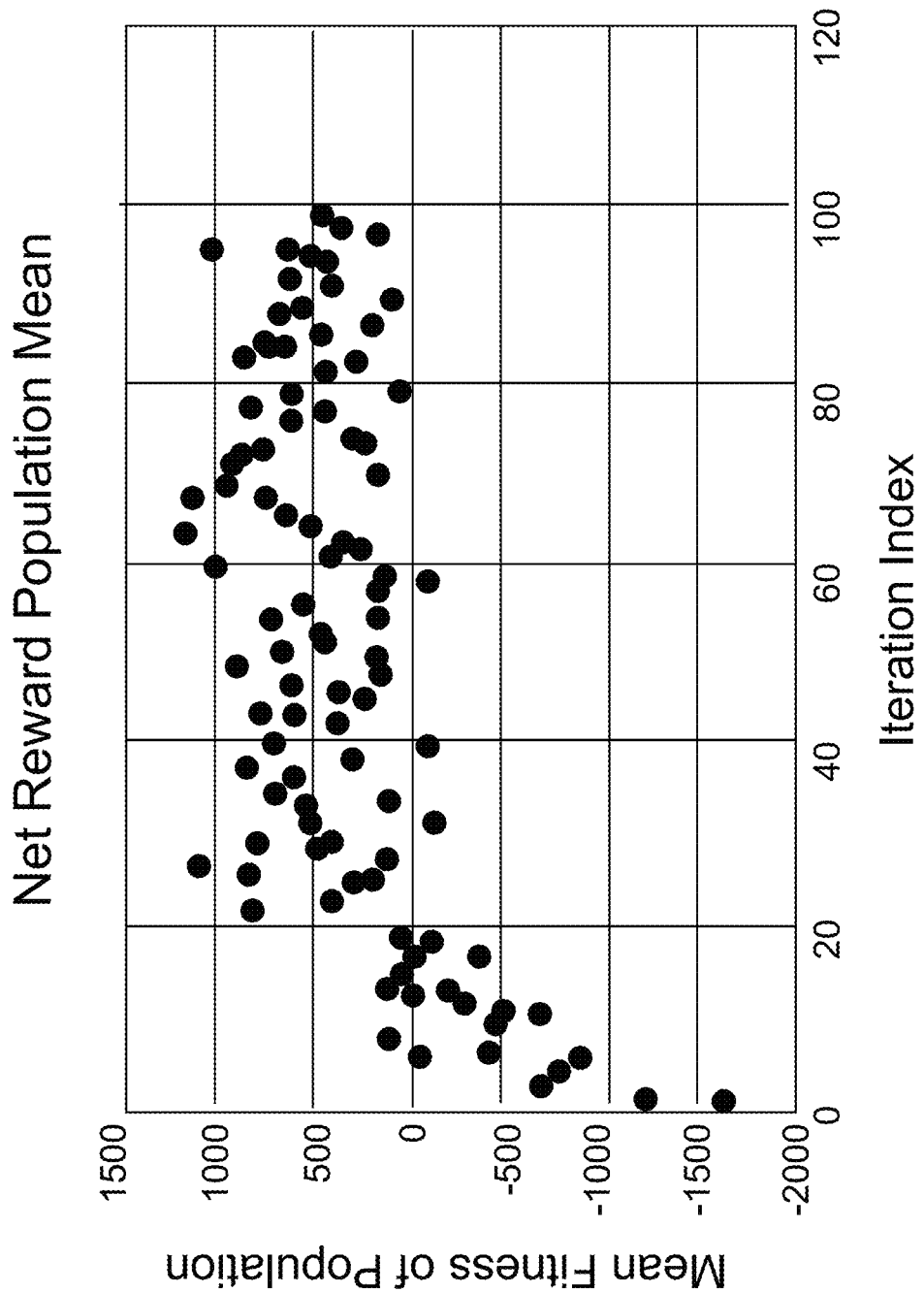
FIG. 9 is an illustration of a training progression according to some embodiments of the present disclosure.

The training progression results shown in FIG. 9 indicate that the mean fitness of the population exhibits an overall upward trend during training. It appears that much of the improvement occurs in the first 20 iterations. These results also highlight the stochastic nature of the simulated environment described herein. Because the platforms start out with random positions and orientations, it is possible for an effective set of parameters to receive a low fitness score 320. This unique characteristic of the environment motivates the usefulness of the unique mutation operator described above.

FIG. 10 is a table of results of an adversarial competition in AFSIM between the AI of the present invention, which controls the blue team of aircraft, and a scripted opponent that uses existing technology, which controls the red team of aircraft. As shown, the new AI solution described herein achieves a very large ratio of wins over losses against the scripted opponent in 1v1, 2v2, and 3v3 engagements.

The recent work with actor-critic reinforcement learning uses a technical approach that is very different from what is described in this disclosure. The prior work involving neuroevolution (see Literature Reference No. 7) did not attempt to address multi-agent environments. At least two major use cases are envisioned for the invention described herein. The first is for control of real-world autonomous systems. At present, military and civilian unmanned platforms (especially UAVs for surveillance and targeted strikes on ground targets) are typically controlled remotely by a human. The present invention can be used to help control these units when communication with the human pilot is impaired, as long as the unmanned units out in the field are still able to communicate with each other.

A second use case is in mission planning and analytics for military applications. It is typical for military analysts to build simulated models of missions using software packages, such as the AFSIM. The challenge addressed by this invention is the need for realistic simulated behavior of these platforms (both manned and unmanned) involved in the simulated mission. In this context, the invention's purpose is to provide autonomous behavior for the purpose of simulating and better understanding the behavior of teams of platforms in military engagements, even if most or all of these platforms are actually controlled by humans during the actual engagement.

Furthermore, the invention described herein is also expected to do better than current CONOPS (i.e., concept of operation describing the characteristics of a proposed system from the viewpoint of an individual who will use that system) of using traditional AI (e.g., rule-based) or human-scripted methods for controlling or evaluating behaviors of a multi-agent team of platforms. This invention is expected to produce behaviors superior to those developed by humans, in terms of achieving mission objectives. For example, suppose that an aircraft has the option of performing two completely different basic maneuvers, each of which lasts 200 time-steps. If the reinforcement learning system assigns probability 0.5 to each maneuver, the probability that it will figure out how to execute either maneuver perfectly at every step is only $0.5^{200}=6e-61$.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

The invention claimed is:

1. A system for controlling a plurality of autonomous platforms, the system comprising:
one or more processors and a non-transitory computer-readable medium having executable instructions encoded thereon such that when executed, the one or more processors perform operations of:
performing a training process to produce a trained learning agent in a simulation environment comprising a plurality of controlled platforms and a plurality of target platforms, comprising:
for each simulation time-step until an episode ends:
assigning each controlled platform to one target platform, wherein each target platform produces an observation;
processing, with a learning agent, each observation using a deep learning network;
for each observation, producing, by the learning agent, an action corresponding to each controlled platform until an action has been produced for each controlled platform in the simulation environment;
obtaining a reward value corresponding to the episode; and
executing the trained learning agent to control each autonomous platform comprising a plurality of platform sensors and platform actuators, wherein executing the trained agent comprises:
receiving, by the trained agent, one or more observations from at least one platform sensor;
producing a behavior-level action based on the one or more observations; and
causing one or more platform actuators to perform a physical action based on the behavior-level action.

2. The system as set forth in claim 1, wherein during the training process, the one or more processors further perform operations of:
randomly initializing a set of parameter vectors having a plurality of parameters, each parameter vector defining a set of network weights for the deep learning neural network;
performing, on the set of parameter vectors, a plurality of iterations of an evaluation process, a selection process, a replication process, and a mutation process;
wherein the evaluation process comprises using the simulated environment to produce a fitness score based on the reward value,
wherein the selection and replication processes comprise selection and replication of certain parameter vectors based on fitness scores; and
wherein the mutation process comprises adding random numbers to some or all parameters in each parameter vector.

3. The system as set forth in claim 2, wherein the selection process is performed by deleting all parameter vectors that receive a fitness score below a predetermined threshold, and wherein the replication process is performed by sampling from remaining parameter vectors of the selection process uniformly with replacement.

4. The system as set forth in claim 2, wherein in the mutation process, a randomly selected fraction of the replication vectors are not mutated.

5. The system as set forth in claim 1, wherein the Kuhn-Munkres algorithm is used to assign each controlled platform to one target platform.

6. The system as set forth in claim 1, wherein each autonomous platform is an autonomous vehicle.

7. A computer implemented method for controlling a plurality of autonomous platforms, the method comprising an act of:
   causing one or more processers to execute instructions encoded on a non-transitory computer-readable medium, such that upon execution, the one or more processors perform operations of:
   performing a training process to produce a trained learning agent in a simulation environment comprising a plurality of controlled platforms and a plurality of target platforms, comprising:
      for each simulation time-step until an episode ends:
         assigning each controlled platform to one target platform, wherein each target platform produces an observation;
         processing, with a learning agent, each observation using a deep learning network;
         for each observation, producing, by the learning agent, an action corresponding to each controlled platform until an action has been produced for each controlled platform in the simulation environment;
         obtaining a reward value corresponding to the episode; and
   executing the trained learning agent to control each autonomous platform comprising a plurality of platform sensors and platform actuators, wherein executing the trained agent comprises:
      receiving, by the trained agent, one or more observations from at least one platform sensor;
      producing a behavior-level action based on the one or more observations; and
      causing one or more platform actuators to perform a physical action based on the behavior-level action.

8. The method as set forth in claim 7, wherein during the training process, the one or more processors further perform operations of:
   randomly initializing a set of parameter vectors having a plurality of parameters, each parameter vector defining a set of network weights for the deep learning neural network;
   performing, on the set of parameter vectors, a plurality of iterations of an evaluation process, a selection process, a replication process, and a mutation process;
   wherein the evaluation process comprises using the simulated environment to produce a fitness score based on the reward value,
   wherein the selection and replication processes comprise selection and replication of certain parameter vectors based on fitness scores; and
   wherein the mutation process comprises adding random numbers to some or all parameters in each parameter vector.

9. The method as set forth in claim 8, wherein the selection process is performed by deleting all parameter vectors that receive a fitness score below a predetermined threshold, and wherein the replication process is performed by sampling from remaining parameter vectors of the selection process uniformly with replacement.

10. The method as set forth in claim 8, wherein in the mutation process, a randomly selected fraction of the replication vectors are not mutated.

11. The method as set forth in claim 7, wherein the Kuhn-Munkres algorithm is used to assign each controlled platform to one target platform.

12. The method as set forth in claim 7, wherein each autonomous platform is an autonomous vehicle.

13. A computer program product for controlling a plurality of autonomous platforms, the computer program product comprising:
   computer-readable instructions stored on a non-transitory computer-readable medium that are executable by a computer having one or more processors for causing the processor to perform operations of:
   performing a training process to produce a trained learning agent in a simulation environment comprising a plurality of controlled platforms and a plurality of target platforms, comprising:
      for each simulation time-step until an episode ends:
         assigning each controlled platform to one target platform, wherein each target platform produces an observation;
         processing, with a learning agent, each observation using a deep learning network;
         for each observation, producing, by the learning agent, an action corresponding to each controlled platform until an action has been produced for each controlled platform in the simulation environment;
         obtaining a reward value corresponding to the episode; and
   executing the trained learning agent to control each autonomous platform comprising a plurality of platform sensors and platform actuators, wherein executing the trained agent comprises:
      receiving, by the trained agent, one or more observations from at least one platform sensor;
      producing a behavior-level action based on the one or more observations; and
      causing one or more platform actuators to perform a physical action based on the behavior-level action.

14. The computer program product as set forth in claim 13, wherein during the training process, the one or more processors further perform operations of:
   randomly initializing a set of parameter vectors having a plurality of parameters, each parameter vector defining a set of network weights for the deep learning neural network;
   performing, on the set of parameter vectors, a plurality of iterations of an evaluation process, a selection process, a replication process, and a mutation process;
   wherein the evaluation process comprises using the simulated environment to produce a fitness score based on the reward value,
   wherein the selection and replication processes comprise selection and replication of certain parameter vectors based on fitness scores; and
   wherein the mutation process comprises adding random numbers to some or all parameters in each parameter vector.

15. The computer program product as set forth in claim 14, wherein the selection process is performed by deleting all parameter vectors that receive a fitness score below a predetermined threshold, and wherein the replication process is performed by sampling from remaining parameter vectors of the selection process uniformly with replacement.

16. The computer program product as set forth in claim 14, wherein in the mutation process, a randomly selected fraction of the replication vectors are not mutated.

17. The computer program product as set forth in claim 13, wherein the Kuhn-Munkres algorithm is used to assign each controlled platform to one target platform.

18. The computer program product as set forth in claim 13, wherein each autonomous platform is an autonomous vehicle.

\* \* \* \* \*